United States Patent Office 3,274,475
Patented Sept. 20, 1966

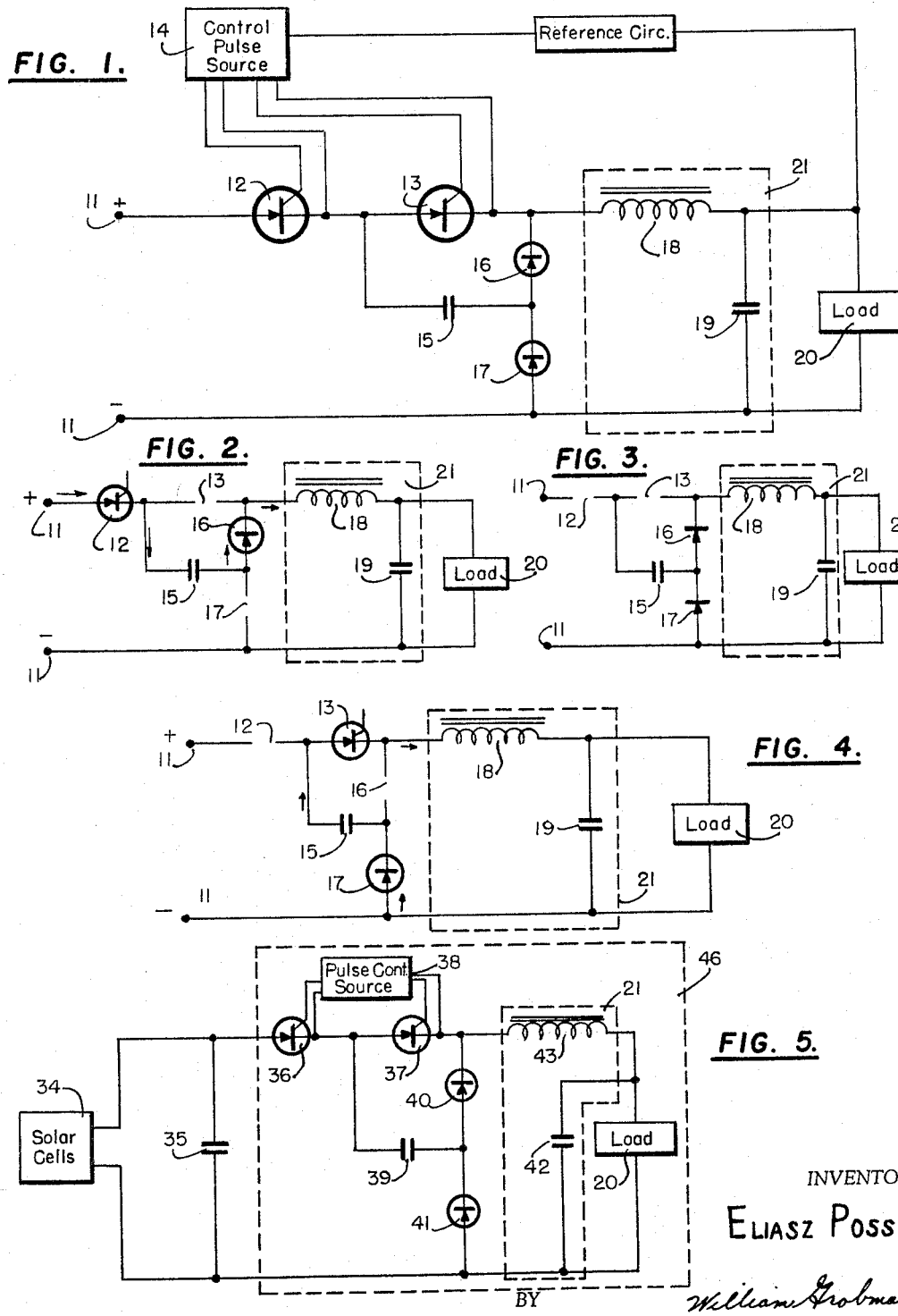

3,274,475
CONVERTER CIRCUIT
Eliasz Poss, Easthaven, Conn., assignor to Electronic Energy Conversion Corporation, New York, N.Y.
Filed Feb. 5, 1963, Ser. No. 256,281
5 Claims. (Cl. 320—1)

This invention relates to converters, and, more particularly, to converters which are particularly suitable for converting direct current of one potential into direct current of a lower potential.

The rapid growth of alternating current for power uses, even though direct current had earlier become established in many places, was due primarily to the ease with which the potential of alternating current can be controlled. Alternating current can be generated at fairly low potentials, then transformed to a much higher potential for transmission over long distances, and finally transformed back to a lower potential suitable for use. And the potential of the alternating energy can be matched to a particular use with no trouble and at high efficiencies.

However, there are some instances when direct current is required and is available, but at a potential which is too high for a particular use. This is true in space vehicles, missiles and the like. In such vehicles, rotary converters or synchronous rectifiers and transformers have been used. Most present day converters are, to a great extent, mechanical in nature, introducing unwanted maintenance problems. In systems where a supply of high voltage direct current is available for some uses, and a lower potential direct current is needed for other uses, rheostats and resistors used to lower the voltage also waste a large amount of power, and require the provision of power supplies which are larger than would ordinarily be needed. In installations such as mines where direct current at 600 volts is available for power uses, and in remote systems where direct current is transmitted at high voltage and small currents, the system of this invention is particularly useful. This converter utilizes high voltage switching devices and subjects the switching devices to potentials no higher than the input voltage.

It is an object of this invention to provide a new and improved converter system.

It is another object of this invention to provide a new and improved converter system which is efficient in operation, readily maintained, and is controllable.

It is a further object of this invention to provide an all-electronic converter which is used for converting direct current at one potential to direct current at a lower potential.

It is still another object of this invention to provide a converter circuit which utilizes high voltage switching devices and which maintains applied potentials no higher than the input potential.

Other objects and advantages of this invention will become more apparent as the following description proceeds, which description should be considered together with the accompanying drawings in which:

FIG. 1 is a schematic diagram of the circuit of the converter of this invention;

FIGS. 2, 3 and 4 are schematic diagrams illustrating the several steps in the operation of the converter of FIG. 1; and FIG. 5 is a circuit diagram of a solar cell power supply which illustrates one manner in which the converter of this invention may be used.

Referring now to the drawings, and to FIG. 1 in particular, the reference character 11 designates a pair of input terminals adapted to be connected to a source of direct current (not shown). The positive input terminal of the pair 11 is connected to the anode of a controlled rectifier 12, the cathode of which is connected to the anode of a second controlled rectifier 13. A source 14 of control pulses, shown here merely as a block since any suitable source may be used, is connected separately to the control electrodes of the two rectifiers 12 and 13. A branch circuit connected from the cathode of the rectifier 13 to the negative input terminal of the pair 11 contains two diodes 16 and 17 in series. A capacitor 15 connects the junction of the two rectifiers 12 and 13 with the junction of the two diodes 16 and 17, effectively shunting diode 16 and rectifier 13. A filter 21 comprising a series inductor 18 and a parallel capacitor 19 is connected to the output from the rectifier 13, and a suitable load, represented here as block 20, is connected across the filter circuit 21. Connected from the output of the filter 21 to the control pulse source 14 is a reference circuit 22 which may be included to utilize the output potential for controlling the timing of the control pulses from the source 14.

The operation of the converter of FIG. 1 is better described with reference to FIGS. 2, 3 and 4 wherein open-circuited components are shown as absent from the circuit. A source of direct current is connected to the input terminals 11 and a positive pulse is applied to the control electrode of the rectifier 12 from the source 14 to fire that rectifier. Current then flows, as shown in FIG. 2, from the positive terminal of the pair 11, through the rectifier 12, the capacitor 15 and the diode 16 to the filter 21 and the load 20. This conduction continues until the capacitor 15 is charged to the potential of the source. When the capacitor 15 has charged, conduction through the rectifier 12 stops, and no current flows through the input terminals 11 as shown in FIG. 3. Then a positive pulse is applied from the source 14 to the control electrode of the rectifier 13 to fire that rectifier, and current flows, as shown in FIG. 4, from one side of the capacitor 15, through the rectifier 13, the filter 21 the load 20, and the diode 17 to the other side of the capacitor 15, discharging that capacitor and preparing the converter for another cycle of operation. Thus, even though the current through the capacitor 15 flows in opposite directions during the two steps of a cycle, the output current is always of the same polarity.

The purpose of the converter of FIG. 1 is to provide a source of direct current which is readily controlled to supply a selective amount of current within the capacity of the unit. In addition, the system of FIG. 1 also is substantially independent of variations in the impedance of the load 20. As explained in greater detail in the copending application Serial Number 111,746, now Patent No. 3,057,059, Power Supplies, filed by Victor Wouk and Eliasz Poss on May 22, 1961, the current output from a switching system such as that of FIG. 1 is determined by the ratio of the time during each cycle of operation that the system conducts current to the time during each cycle that the system does not conduct. Applying this statement to the system of FIG. 1, with a capacitor 15 of a fixed size, the time of conduction can be controlled by the time between the triggering pulses applied from the source 14 to the control electrodes of the rectifiers 12 and 13. The time during which the rectifiers conduct is a function of the input potential and of the size of the capacitor 15. But the time during which the rectifiers are non-conductive can be controlled by the application of the triggering pulses. Thus, assuming that a pulse is applied to the control electrode of rectifier 12, that rectifier conducts until the capacitor 15 is charged, and then conduction in the system ceases. If, now, no pulse is applied to the control electrode of the rectifier 13 until an interval of time equal to time that the rectifier 12 was conductive passes, then the system conducts during only one half of a cycle. If the interval of time between the halting of conduction through the rectifier 12 and the firing of rectifier 13 is twice the time that the rectifier 12 is conductive, then the system is conductive only one-third of the time. The integrated output applied to the load 20 is proportional to the amount of time during a cycle that the system is conductive. Thus, by controlling the spacing of the pulses from the source 14 applied to the rectifiers 12 and 13 to trigger these rectifiers, the output current can be controlled, almost entirely independently of the size of the load 20. Circuits for supplying control pulses such as the source 14 are shown and described in detail in the above-mentioned application S.N. 111,746, and references should be made thereto for such circuits. In addition, the output potential from the filter 21 may be fed back to a reference circuit shown here only as a block for regulating the timing of the pulses from the source 14 to maintain a regulated output. The output potential may also be regulated, if desired, by controlling the size of the capacitor 15. Or, the two means may be combined to provide coarse and fine regulation.

The efficiency of the system of FIG. 1, both in operation and in material, can be improved by utilizing timing pulses from the source 14 which are of high frequency. The timing pulses may have any frequency, such as from 100 cycles per second to 100 kilocycles per second, but the higher frequency pulses result in higher switching rates. The higher switching rates reduce the sizes needed for both the capacitor 15 and the components of the filter 21, the inductor 18 and the capacitor 19. As the switching frequency increases, the time during which the capacitor 15 may charge and discharge decreases, and the size required for the capacitor 15 also decreases. In addition, the higher the ripple frequency of a rectifier direct current, the smaller the filter components need be to eliminate that ripple. So, with an increase in the frequency of the pulse output from the source 14, a decrease in the size and weight of the system components is achieved. In this respect, the system of FIG. 1 is particularly conservative of electrical components. The converter of FIG. 1 controls the current flow through the load 20 by controlling the switching rate. This eliminates the need for a transformer or other impedance device for accomplishing the same results. Since a transformer, with its large and heavy iron core, is usually the largest and heaviest component in a power supply, the elimination of the transformer conserves material, space and weight.

One possible system in which the converter of FIG. 1 may form an integral part is shown in FIG. 5. A bank of solar cells 34, shown here merely as a block, is connected across an integrating capacitor 35 and supplies relatively high potential direct current to a converter 46. The converter 46 comprises a pair of series connected controlled rectifiers 36 and 37 connected in the positive line, a branch circuit comprising two series connected diodes 40 and 41, a filter 21 comprising an inductor 43 connected in series in the positive line and a shunt capacitor, and a source 38 of control pulses connected to the control electrodes of the rectifiers 36 and 37.

The operation of the power supply of FIG. 5 is similar to the operation of the converter of FIG. 1. The bank of solar cells 34 generates direct current of a relatively high voltage when irradiated with light. The output of the cells 34 varies with the intensity of the light irradiating them, and the capacitor 35 serves to integrate the output of the cells 34 to present a relatively smooth direct current to the input of the converter 46. When a positive pulse is applied by the source 38 to the control electrode of the rectifier 36, that rectifier becomes conductive, and current flows through the rectifier 36, the capacitor 39, and the diode 40 to the filter 21 and the load 20. Conduction through the rectifier 36 ceases when the capacitor 39 is fully charged. The next positive pulse from the source 38 is applied to the control electrode of the rectifier 37 which becomes conductive. Current then flows from one side of the capacitor 39, through the rectifier 37, the filter 21, the load 20 and the diode 41 to the other side of the capacitor 39, permitting the capacitor 39 to discharge. The circuit is then ready for the next cycle of operation. By controlling the frequency of the pulse output from the source 38, the amount of output current applied to the load 20 is also controlled. Thus, controlled direct current is supplied to a load from an uncontrolled source.

Since there are no resistors in series with the main current path, and since the inherent forward resistance of the controlled rectifiers is extremely small, the power loss in the converter of this invention is small, and the efficiency is high. In addition, control of the amount of current output of the converter is achieved with high efficiency. By utilizing control pulses of high frequency, the size and weight of the circuit components can be made small, thus reducing the amount of material required and raising the material efficiency appreciably.

The above specification has described a new and improved converter which produces a controlled output with a minimum of equipment and which operates at very high efficiencies, also conserving power. It is realized that the above disclosure may indicate to those in the art other ways in which the principles set forth herein may be used without invention hereover, and it is, therefore, intended that this invention be limited only by the scope of the appended claims.

What is claimed is:

1. An electrical converter circuit for supplying controllable direct current from an uncontrolled source of electrical energy, said circuit comprising a capacitor, means for charging said capacitor in a first direction, means for passing said charging current through a load in said first direction, means for selectively discharging said capacitor in a second direction, means for passing said discharging current through a load in said first direction, and means for selectively determining the times during which said capacitor is charged and discharged.

2. The circuit defined in claim 1 further including a filter circuit connected to said capacitor to remove pulsations from the combined charging and discharging current.

3. An electrical converter circuit for converting the direct current voltage of a first average magnitude to a direct current voltage of a second and lower average magnitude, said circuit comprising: a pair of input terminals across which a source of input current voltage is to be connected; a pair of load terminals across which a load is to be connected; one of said input and one of said output terminals being connected to a common point; first switch means, a capacitor and a first rectifier connected in the order named in series between the other of said pair of input terminals and the other of said load terminals for providing a charge circuit for said capacitor through the load connected to said load terminals when the switch means is in a conductive state, said first switch means and said first rectifier becoming non-conductive when the capacitor is fully charged; second switch means coupled between the juncture of said capacitor with said first switch means and said other load terminal and a second rectifier coupled between the juncture of said first rectifier with said capacitor and said common point for providing a discharge path for said capacitor through the load connected to said load terminals when said second switch means is operated to a conductive state, the second switch means becoming non-conductive when the capacitor is discharged; the means for operating said first switch means to a conductive state to charge the capacitor through the load and subsequently to operate said second switch means to a conductive state to discharge the capacitor through the load.

4. The converter circuit of claim 3 wherein said first and second switch means are each controlled rectifier devices which are fired from a non-conductive to a conductive state on application of a control signal thereto and which reverts to a non-conductive state when the current flow therein reduces below a given holding level, and the means for operating said switch means comprising means for generating said control signals.

5. An electrical converter circuit for supplying controllable direct current to a load, said circuit comprising: a capacitor, means for charging said capacitor in a first direction, means for passing said charging current through said load in said first direction, means for selectively discharging said capacitor in a second direction, and means for passing said discharging current through the load in said first direction.

References Cited by the Examiner

FOREIGN PATENTS 909,020 10/1962 Great Britain.

BERNARD KONICK, *Primary Examiner.*

IRVING SRAGOW, *Examiner.*

R. J. GARBACIK, T. W. FEARS, *Assistant Examiners.*